(12) United States Patent
Pabst et al.

(10) Patent No.: US 8,120,198 B2
(45) Date of Patent: Feb. 21, 2012

(54) WIND POWER TURBINE

(75) Inventors: Otto Pabst, Rio di Pusteria (IT); Matteo Casazza, Vipiteno (IT); Emmanuele Gelmini, Trento (IT)

(73) Assignee: Wilic S.AR.L., Luxembourg (LU)

( * ) Notice: Subject to any disclaimer, the term of this patent is extended or adjusted under 35 U.S.C. 154(b) by 413 days.

(21) Appl. No.: 12/508,082

(22) Filed: Jul. 23, 2009

(65) Prior Publication Data

US 2010/0019502 A1    Jan. 28, 2010

(30) Foreign Application Priority Data

Jul. 23, 2008    (IT) .............................. MI2008A1340

(51) Int. Cl.
*F03D 11/00* (2006.01)

(52) U.S. Cl. .......................................... 290/55; 415/126

(58) Field of Classification Search .................... 290/55; 415/126

See application file for complete search history.

(56) References Cited

U.S. PATENT DOCUMENTS

| | | |
|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |
| 3,392,910 A | 7/1968 | Tanzberger |
| 3,468,548 A | 9/1969 | Webb |

(Continued)

FOREIGN PATENT DOCUMENTS

CA    2404939    4/2004

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Joseph Waks
(74) *Attorney, Agent, or Firm* — K&L Gates LLP

(57) ABSTRACT

A wind power turbine has a fixed assembly; a mobile assembly fitted to the fixed assembly to rotate about an axis with respect to the fixed assembly; and a locking device for making the mobile assembly and the fixed assembly integral with each other; the locking device has at least one groove formed on the fixed assembly or the mobile assembly and coaxial with the axis, and angular locking means that can be activated to pressure engage the groove.

21 Claims, 7 Drawing Sheets

U.S. PATENT DOCUMENTS

| | | | |
|---|---|---|---|
| 3,700,247 | A | 10/1972 | Butler et al. |
| 3,724,861 | A | 4/1973 | Lesiecki |
| 3,746,349 | A | 7/1973 | Smale et al. |
| 3,748,089 | A | 7/1973 | Boyer et al. |
| 3,789,252 | A | 1/1974 | Abegg |
| 3,841,643 | A | 10/1974 | McLean |
| 3,860,843 | A | 1/1975 | Kawasaki et al. |
| 3,942,026 | A | 3/1976 | Carter |
| 3,963,247 | A | 6/1976 | Nommensen |
| 3,968,969 | A | 7/1976 | Mayer et al. |
| 4,022,479 | A | 5/1977 | Orlowski |
| 4,061,926 | A | 12/1977 | Peed |
| 4,087,698 | A | 5/1978 | Myers |
| 4,273,343 | A | 6/1981 | Visser |
| 4,289,970 | A | 9/1981 | Deibert |
| 4,291,235 | A | 9/1981 | Bergey, Jr. et al. |
| 4,292,532 | A | 9/1981 | Leroux |
| 4,336,649 | A | 6/1982 | Glaser |
| 4,339,874 | A | 7/1982 | Mc'Carty et al. |
| 4,348,604 | A | 9/1982 | Thode |
| 4,350,897 | A | 9/1982 | Benoit |
| 4,354,126 | A | 10/1982 | Yates |
| 4,368,895 | A | 1/1983 | Okamoto et al. |
| 4,398,773 | A | 8/1983 | Boden et al. |
| 4,452,046 | A | 6/1984 | Valentin |
| 4,482,831 | A | 11/1984 | Notaras et al. |
| 4,490,093 | A | 12/1984 | Chertok et al. |
| 4,517,483 | A | 5/1985 | Hucker et al. |
| 4,517,484 | A | 5/1985 | Dacier |
| 4,521,026 | A | 6/1985 | Eide |
| 4,585,950 | A | 4/1986 | Lund |
| 4,613,779 | A | 9/1986 | Meyer |
| 4,638,200 | A | 1/1987 | Le Corre et al. |
| 4,648,801 | A | 3/1987 | Wilson |
| 4,694,654 | A | 9/1987 | Kawamura |
| 4,700,096 | A | 10/1987 | Epars |
| 4,714,852 | A | 12/1987 | Kawada et al. |
| 4,720,640 | A | 1/1988 | Anderson et al. |
| 4,722,661 | A | 2/1988 | Mizuno |
| 4,724,348 | A | 2/1988 | Stokes |
| 4,761,590 | A | 8/1988 | Kaszman |
| 4,792,712 | A | 12/1988 | Stokes |
| 4,801,244 | A | 1/1989 | Stahl |
| 4,866,321 | A | 9/1989 | Blanchard et al. |
| 4,900,965 | A | 2/1990 | Fisher |
| 4,906,060 | A | 3/1990 | Claude |
| 4,973,868 | A | 11/1990 | Wust |
| 4,976,587 | A | 12/1990 | Johnston et al. |
| 5,004,944 | A | 4/1991 | Fisher |
| 5,063,318 | A | 11/1991 | Anderson |
| 5,090,711 | A | 2/1992 | Becker |
| 5,091,668 | A | 2/1992 | Cuenot et al. |
| 5,177,388 | A | 1/1993 | Hotta et al. |
| 5,191,255 | A | 3/1993 | Kloosterhouse et al. |
| 5,275,139 | A | 1/1994 | Rosenquist |
| 5,280,209 | A | 1/1994 | Leupold et al. |
| 5,281,094 | A | 1/1994 | McCarty et al. |
| 5,298,827 | A | 3/1994 | Sugiyama |
| 5,302,876 | A | 4/1994 | Iwamatsu et al. |
| 5,311,092 | A | 5/1994 | Fisher |
| 5,315,159 | A | 5/1994 | Gribnau |
| 5,331,238 | A | 7/1994 | Johnsen |
| 5,410,997 | A | 5/1995 | Rosenquist |
| 5,419,683 | A | 5/1995 | Peace |
| 5,456,579 | A | 10/1995 | Olson |
| 5,483,116 | A | 1/1996 | Kusase et al. |
| 5,506,453 | A | 4/1996 | McCombs |
| 5,579,800 | A | 12/1996 | Walker |
| 5,609,184 | A | 3/1997 | Apel et al. |
| 5,663,600 | A | 9/1997 | Baek et al. |
| 5,670,838 | A | 9/1997 | Everton |
| 5,696,419 | A | 12/1997 | Rakestraw et al. |
| 5,704,567 | A | 1/1998 | Maglieri |
| 5,746,576 | A | 5/1998 | Bayly |
| 5,777,952 | A | 7/1998 | Nishimura et al. |
| 5,783,894 | A | 7/1998 | Wither |
| 5,793,144 | A | 8/1998 | Kusase et al. |
| 5,798,632 | A | 8/1998 | Muljadi |
| 5,801,470 | A | 9/1998 | Johnson et al. |
| 5,811,908 | A | 9/1998 | Iwata et al. |
| 5,814,914 | A | 9/1998 | Caamaño |
| 5,844,333 | A | 12/1998 | Sheerin |
| 5,844,341 | A | 12/1998 | Spooner et al. |
| 5,857,762 | A | 1/1999 | Schwaller |
| 5,886,441 | A | 3/1999 | Uchida et al. |
| 5,889,346 | A | 3/1999 | Uchida et al. |
| 5,894,183 | A | 4/1999 | Borchert |
| 5,925,964 | A | 7/1999 | Kusase et al. |
| 5,952,755 | A | 9/1999 | Lubas |
| 5,961,124 | A | 10/1999 | Muller |
| 5,973,435 | A | 10/1999 | Irie et al. |
| 5,986,374 | A | 11/1999 | Kawakami |
| 5,986,378 | A | 11/1999 | Caamaño |
| 6,013,968 | A | 1/2000 | Lechner et al. |
| 6,037,692 | A | 3/2000 | Miekka et al. |
| 6,064,123 | A | 5/2000 | Gislason |
| 6,067,227 | A | 5/2000 | Katsui et al. |
| 6,089,536 | A | 7/2000 | Watanabe et al. |
| 6,093,984 | A | 7/2000 | Shiga et al. |
| 6,127,739 | A | 10/2000 | Appa |
| 6,172,429 | B1 | 1/2001 | Russell |
| 6,177,746 | B1 | 1/2001 | Tupper et al. |
| 6,193,211 | B1 | 2/2001 | Watanabe et al. |
| 6,194,799 | B1 | 2/2001 | Miekka et al. |
| 6,215,199 | B1 | 4/2001 | Lysenko et al. |
| 6,232,673 | B1 | 5/2001 | Schoo et al. |
| 6,278,197 | B1 | 8/2001 | Appa |
| 6,285,090 | B1 | 9/2001 | Brutsaert et al. |
| 6,326,711 | B1 | 12/2001 | Yamaguchi et al. |
| 6,365,994 | B1 | 4/2002 | Watanabe et al. |
| 6,373,160 | B1 | 4/2002 | Schrödl |
| 6,376,956 | B1 | 4/2002 | Hosoya |
| 6,378,839 | B2 | 4/2002 | Watanabe et al. |
| 6,384,504 | B1 | 5/2002 | Ehrhart et al. |
| 6,417,578 | B1 | 7/2002 | Chapman et al. |
| 6,428,011 | B1 | 8/2002 | Oskouei |
| 6,452,287 | B1 | 9/2002 | Looker |
| 6,452,301 | B1 | 9/2002 | Van Dine et al. |
| 6,455,976 | B1 | 9/2002 | Nakano |
| 6,472,784 | B2 | 10/2002 | Miekka et al. |
| 6,474,653 | B1 | 11/2002 | Hintenlang et al. |
| 6,476,513 | B1 | 11/2002 | Gueorguiev |
| 6,483,199 | B2 | 11/2002 | Umemoto et al. |
| 6,492,743 | B1 | 12/2002 | Appa |
| 6,492,754 | B1 | 12/2002 | Weiglhofer et al. |
| 6,499,532 | B1 | 12/2002 | Williams |
| 6,504,260 | B1 | 1/2003 | Debleser |
| 6,515,390 | B1 | 2/2003 | Lopatinsky et al. |
| 6,520,737 | B1 | 2/2003 | Fischer et al. |
| 6,548,932 | B1 | 4/2003 | Weiglhofer et al. |
| 6,590,312 | B1 | 7/2003 | Seguchi et al. |
| 6,603,232 | B2 | 8/2003 | Van Dine et al. |
| 6,617,747 | B1 | 9/2003 | Petersen |
| 6,629,358 | B2 | 10/2003 | Setiabudi et al. |
| 6,664,692 | B1 | 12/2003 | Kristoffersen |
| 6,676,122 | B1 | 1/2004 | Wobben |
| 6,683,397 | B2 | 1/2004 | Gauthier et al. |
| 6,700,260 | B2 | 3/2004 | Hsu et al. |
| 6,700,288 | B2 | 3/2004 | Smith |
| 6,707,224 | B1 | 3/2004 | Petersen |
| 6,720,688 | B1 | 4/2004 | Schiller |
| 6,727,624 | B2 | 4/2004 | Morita et al. |
| 6,746,217 | B2 | 6/2004 | Kim et al. |
| 6,759,758 | B2 | 7/2004 | Martinez |
| 6,762,525 | B1 | 7/2004 | Maslov et al. |
| 6,781,276 | B1 | 8/2004 | Stiesdal et al. |
| 6,784,564 | B1 | 8/2004 | Wobben |
| 6,794,781 | B2 | 9/2004 | Razzell et al. |
| 6,828,710 | B1 | 12/2004 | Gabrys |
| 6,856,042 | B1 | 2/2005 | Kubota |
| 6,879,075 | B2 | 4/2005 | Calfo et al. |
| 6,888,262 | B2 | 5/2005 | Blakemore |
| 6,891,299 | B2 | 5/2005 | Coupart et al. |
| 6,903,466 | B1 | 6/2005 | Mercier et al. |
| 6,903,475 | B2 | 6/2005 | Ortt et al. |
| 6,906,444 | B2 | 6/2005 | Hattori et al. |
| 6,911,741 | B2 | 6/2005 | Petteersen et al. |

| | | | | | | |
|---|---|---|---|---|---|---|
| 6,921,243 B2 | 7/2005 | Canini et al. | | 2004/0151575 A1 | 8/2004 | Pierce et al. |
| 6,931,834 B2 | 8/2005 | Jones | | 2004/0151577 A1 | 8/2004 | Pierce et al. |
| 6,933,645 B1 | 8/2005 | Watson | | 2004/0189136 A1 | 9/2004 | Kolomeitsev et al. |
| 6,933,646 B2 | 8/2005 | Kinoshita | | 2005/0002783 A1 | 1/2005 | Hiel et al. |
| 6,942,454 B2 | 9/2005 | Ohlmann | | 2005/0002787 A1 | 1/2005 | Wobben |
| 6,945,747 B1 | 9/2005 | Miller | | 2005/0082839 A1 | 4/2005 | McCoin |
| 6,949,860 B2 | 9/2005 | Hama et al. | | 2005/0230979 A1 | 10/2005 | Bywaters et al. |
| 6,951,443 B1 | 10/2005 | Blakemore | | 2005/0280264 A1 | 12/2005 | Nagy |
| 6,972,498 B2 | 12/2005 | Jamieson et al. | | 2006/0000269 A1 | 1/2006 | LeMieux et al. |
| 6,983,529 B2 | 1/2006 | Ortt et al. | | 2006/0001269 A1 | 1/2006 | Jansen et al. |
| 6,984,908 B2 | 1/2006 | Rinholm et al. | | 2006/0006658 A1 | 1/2006 | McCoin |
| 6,987,342 B2 | 1/2006 | Hans | | 2006/0012182 A1 | 1/2006 | McCoin |
| 6,998,729 B1 | 2/2006 | Wobben | | 2006/0028025 A1 | 2/2006 | Kikuchi et al. |
| 7,004,724 B2 | 2/2006 | Pierce et al. | | 2006/0066110 A1 | 3/2006 | Jansen et al. |
| 7,008,172 B2 | 3/2006 | Selsam | | 2006/0071575 A1 | 4/2006 | Jansen et al. |
| 7,008,348 B2 | 3/2006 | LaBath | | 2006/0091735 A1 | 5/2006 | Song et al. |
| 7,016,006 B2 | 3/2006 | Song | | 2006/0125243 A1 | 6/2006 | Miller |
| 7,021,905 B2 | 4/2006 | Torrey et al. | | 2006/0131985 A1 | 6/2006 | Qu et al. |
| 7,028,386 B2 | 4/2006 | Kato et al. | | 2006/0152012 A1 | 7/2006 | Wiegel et al. |
| 7,033,139 B2 | 4/2006 | Wobben | | 2006/0152015 A1 | 7/2006 | Bywaters et al. |
| 7,038,343 B2 | 5/2006 | Agnes et al. | | 2006/0152016 A1 | 7/2006 | Bywaters et al. |
| 7,042,109 B2 | 5/2006 | Gabrys | | 2007/0020109 A1 | 1/2007 | Takahashi et al. |
| 7,057,305 B2 | 6/2006 | Krüger-Gotzmann et al. | | 2007/0116567 A1 | 5/2007 | Luetze |
| 7,075,192 B2 | 7/2006 | Bywaters et al. | | 2007/0187954 A1 | 8/2007 | Struve et al. |
| 7,081,696 B2 | 7/2006 | Ritchey | | 2007/0187956 A1 | 8/2007 | Wobben |
| 7,088,024 B2 | 8/2006 | Agnes et al. | | 2007/0222223 A1 | 9/2007 | Bagepalli et al. |
| 7,091,642 B2 | 8/2006 | Agnes et al. | | 2007/0222226 A1 | 9/2007 | Casazza et al. |
| 7,095,128 B2 | 8/2006 | Canini et al. | | 2007/0222227 A1 | 9/2007 | Casazza et al. |
| 7,098,552 B2 | 8/2006 | McCoin | | 2008/0003105 A1 | 1/2008 | Nies |
| 7,109,600 B1 | 9/2006 | Bywaters et al. | | 2008/0025847 A1 | 1/2008 | Teipen |
| 7,111,668 B2 | 9/2006 | Rürup | | 2008/0050234 A1 | 2/2008 | Ingersoll et al. |
| 7,116,006 B2 | 10/2006 | McCoin | | 2008/0107526 A1 | 5/2008 | Wobben |
| 7,119,469 B2 | 10/2006 | Ortt et al. | | 2008/0118342 A1 | 5/2008 | Seidel et al. |
| 7,154,191 B2 | 12/2006 | Jansen et al. | | 2008/0197636 A1 | 8/2008 | Tilscher et al. |
| 7,161,260 B2 | 1/2007 | Krügen-Gotzmann et al. | | 2008/0197638 A1 | 8/2008 | Wobben |
| 7,166,942 B2 | 1/2007 | Yokota | | 2008/0246224 A1 | 10/2008 | Pabst et al. |
| 7,168,248 B2 | 1/2007 | Sakamoto et al. | | 2008/0290664 A1 | 11/2008 | Kruger |
| 7,168,251 B1 | 1/2007 | Janssen | | 2008/0303281 A1 | 12/2008 | Krueger |
| 7,179,056 B2 | 2/2007 | Sieffriedsen | | 2008/0309189 A1 | 12/2008 | Pabst et al. |
| 7,180,204 B2 | 2/2007 | Grant et al. | | 2008/0315594 A1 * | 12/2008 | Casazza et al. ............ 290/55 |
| 7,183,665 B2 | 2/2007 | Bywaters et al. | | 2009/0045628 A1 | 2/2009 | Erdman et al. |
| 7,196,446 B2 | 3/2007 | Hans | | 2009/0060748 A1 | 3/2009 | Landa et al. |
| 7,205,678 B2 * | 4/2007 | Casazza et al. ............ 290/55 | | 2009/0094981 A1 | 4/2009 | Eggleston |
| 7,217,091 B2 | 5/2007 | LeMieux | | 2009/0096309 A1 | 4/2009 | Pabst et al. |
| 7,259,472 B2 | 8/2007 | Miyake et al. | | 2009/0302702 A1 | 12/2009 | Pabst et al. |
| 7,281,501 B2 | 10/2007 | Leufen et al. | | 2010/0026010 A1 | 2/2010 | Pabst |
| 7,285,890 B2 | 10/2007 | Jones et al. | | 2010/0117362 A1 | 5/2010 | Vihriala et al. |
| 7,323,792 B2 | 1/2008 | Sohn | | 2010/0123318 A1 | 5/2010 | Casazza et al. |
| 7,345,376 B2 | 3/2008 | Costin | | 2010/0140949 A1 * | 6/2010 | Pitre et al. ............ 290/55 |
| 7,358,637 B2 | 4/2008 | Tapper | | | | |
| 7,360,310 B2 * | 4/2008 | Bagepalli et al. ......... 29/898.08 | | FOREIGN PATENT DOCUMENTS | | |
| 7,377,163 B2 | 5/2008 | Miyagawa | | CA | 2518742 | 9/2004 |
| 7,385,305 B2 | 6/2008 | Casazza et al. | | CN | 1554867 | 12/2004 |
| 7,385,306 B2 | 6/2008 | Casazza et al. | | DE | 1130913 | 6/1962 |
| 7,392,988 B2 | 7/2008 | Moldt et al. | | DE | 2164135 | 7/1973 |
| 7,397,145 B2 * | 7/2008 | Struve et al. ............ 290/55 | | DE | 2322458 | 11/1974 |
| 7,427,814 B2 | 9/2008 | Bagepalli et al. | | DE | 2506160 | 8/1976 |
| 7,431,567 B1 | 10/2008 | Bevington et al. | | DE | 2922885 | 12/1980 |
| 7,443,066 B2 | 10/2008 | Salamah et al. | | DE | 3638129 | 5/1988 |
| 7,458,261 B2 | 12/2008 | Miyagawa | | DE | 3718954 | 12/1988 |
| 7,482,720 B2 | 1/2009 | Gordon et al. | | DE | 3844505 | 7/1990 |
| 7,548,008 B2 | 6/2009 | Jansen et al. | | DE | 3903399 | 8/1990 |
| 7,550,863 B2 | 6/2009 | Versteegh | | DE | 4304577 | 8/1994 |
| 7,687,932 B2 | 3/2010 | Casazza et al. | | DE | 4402184 | 8/1995 |
| 7,736,125 B2 * | 6/2010 | Bagepalli et al. ............ 415/126 | | DE | 4415570 | 11/1995 |
| 2002/0047418 A1 | 4/2002 | Seguchi et al. | | DE | 4444757 | 6/1996 |
| 2002/0047425 A1 | 4/2002 | Coupart et al. | | DE | 29706980 | 7/1997 |
| 2002/0056822 A1 | 5/2002 | Watanabe et al. | | DE | 19636591 | 3/1998 |
| 2002/0063485 A1 | 5/2002 | Lee et al. | | DE | 19644355 | 4/1998 |
| 2002/0089251 A1 | 7/2002 | Tajima et al. | | DE | 19652673 | 6/1998 |
| 2002/0148453 A1 | 10/2002 | Watanabe et al. | | DE | 19711869 | 9/1998 |
| 2003/0011266 A1 | 1/2003 | Morita et al. | | DE | 19748716 | 11/1998 |
| 2003/0102677 A1 | 6/2003 | Becker et al. | | DE | 29819391 | 2/1999 |
| 2003/0137149 A1 | 7/2003 | Northrup et al. | | DE | 19801803 | 4/1999 |
| 2003/0230899 A1 | 12/2003 | Martinez | | DE | 19932394 | 1/2001 |
| 2004/0086373 A1 | 5/2004 | Page, Jr. | | DE | 19947915 | 4/2001 |
| 2004/0094965 A1 | 5/2004 | Kirkegaard et al. | | DE | 19951594 | 5/2001 |
| 2004/0119292 A1 | 6/2004 | Datta et al. | | DE | 10000370 | 7/2001 |
| 2004/0150283 A1 | 8/2004 | Calfo et al. | | DE | 20102029 | 8/2001 |

| | | |
|---|---|---|
| DE | 10219190 | 11/2003 |
| DE | 10246690 | 4/2004 |
| DE | 102004018524 | 11/2005 |
| DE | 102004028746 | 12/2005 |
| DE | 102007058746 A1 * | 12/2008 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1167755 A2 * | 1/2002 |
| EP | 1289097 | 3/2003 |
| EP | 1291521 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 1589222 | 10/2005 |
| EP | 1612415 | 1/2006 |
| EP | 1641102 | 3/2006 |
| EP | 1677002 | 7/2006 |
| EP | 1772624 | 4/2007 |
| EP | 1780409 | 5/2007 |
| EP | 1829762 | 9/2007 |
| EP | 1921311 | 5/2008 |
| EP | 2060786 | 5/2009 |
| EP | 2148090 A1 * | 1/2010 |
| ES | 2140301 | 2/2000 |
| FR | 806292 | 12/1936 |
| FR | 859844 | 12/1940 |
| FR | 1348765 | 1/1964 |
| FR | 2401091 | 3/1979 |
| FR | 2445053 | 7/1980 |
| FR | 2519483 | 7/1983 |
| FR | 2594272 | 8/1987 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 0/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 57059462 | 4/1982 |
| JP | 59134385 A * | 8/1984 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2000466 | 9/1993 |
| RU | 2229621 | 5/2004 |
| WO | WO8402382 | 6/1984 |
| WO | WO9105953 | 5/1991 |
| WO | WO9212343 | 7/1992 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2005103489 | 11/2005 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008078342 | 7/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |
| WO | WO 2010072190 A2 * | 7/2010 |

OTHER PUBLICATIONS

Variable Speed Gearless Wind Turbine (website), http://www.mhi.cojp/msmw/mw/en/gearless.html, viewed on Sep. 22, 2006.

* cited by examiner

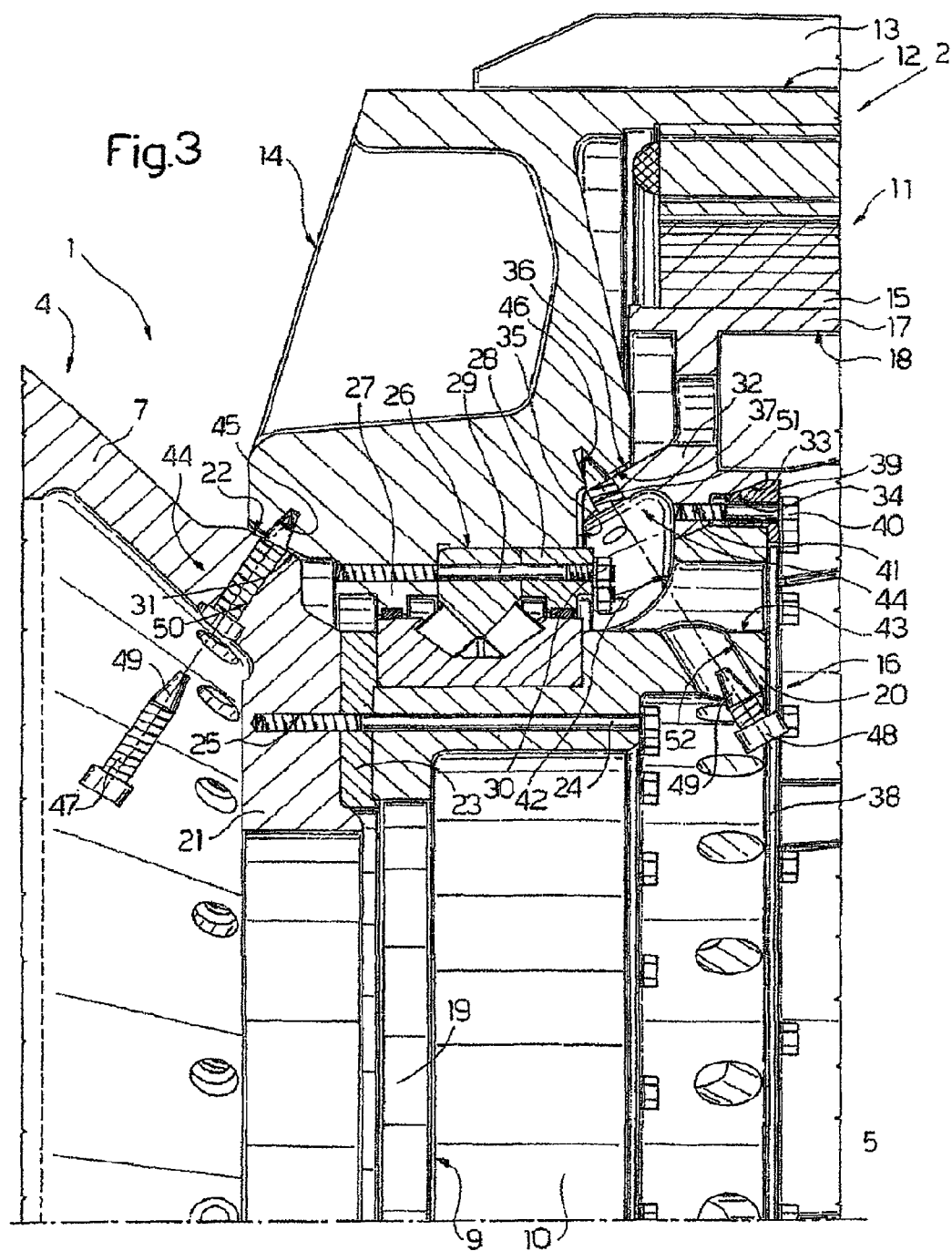

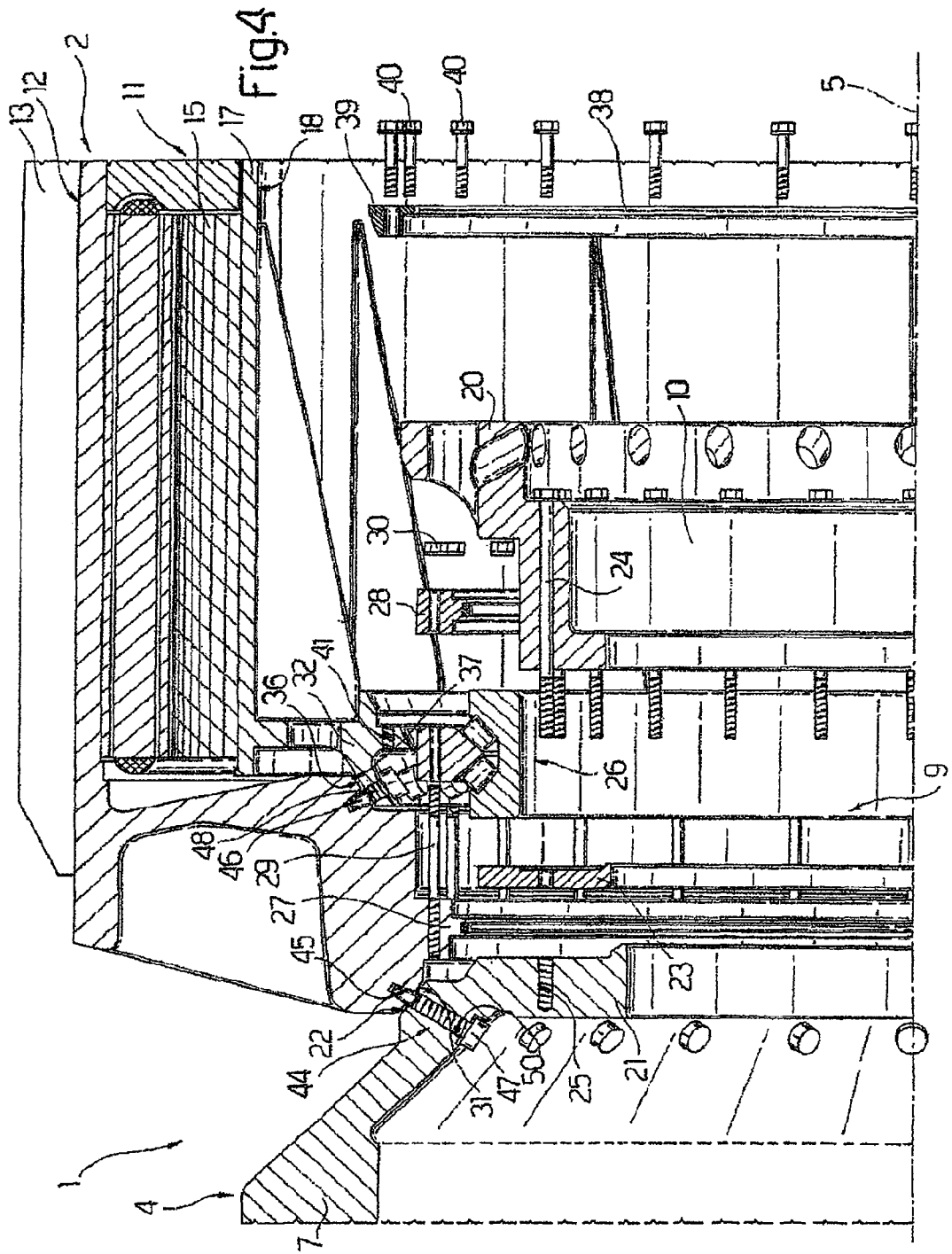

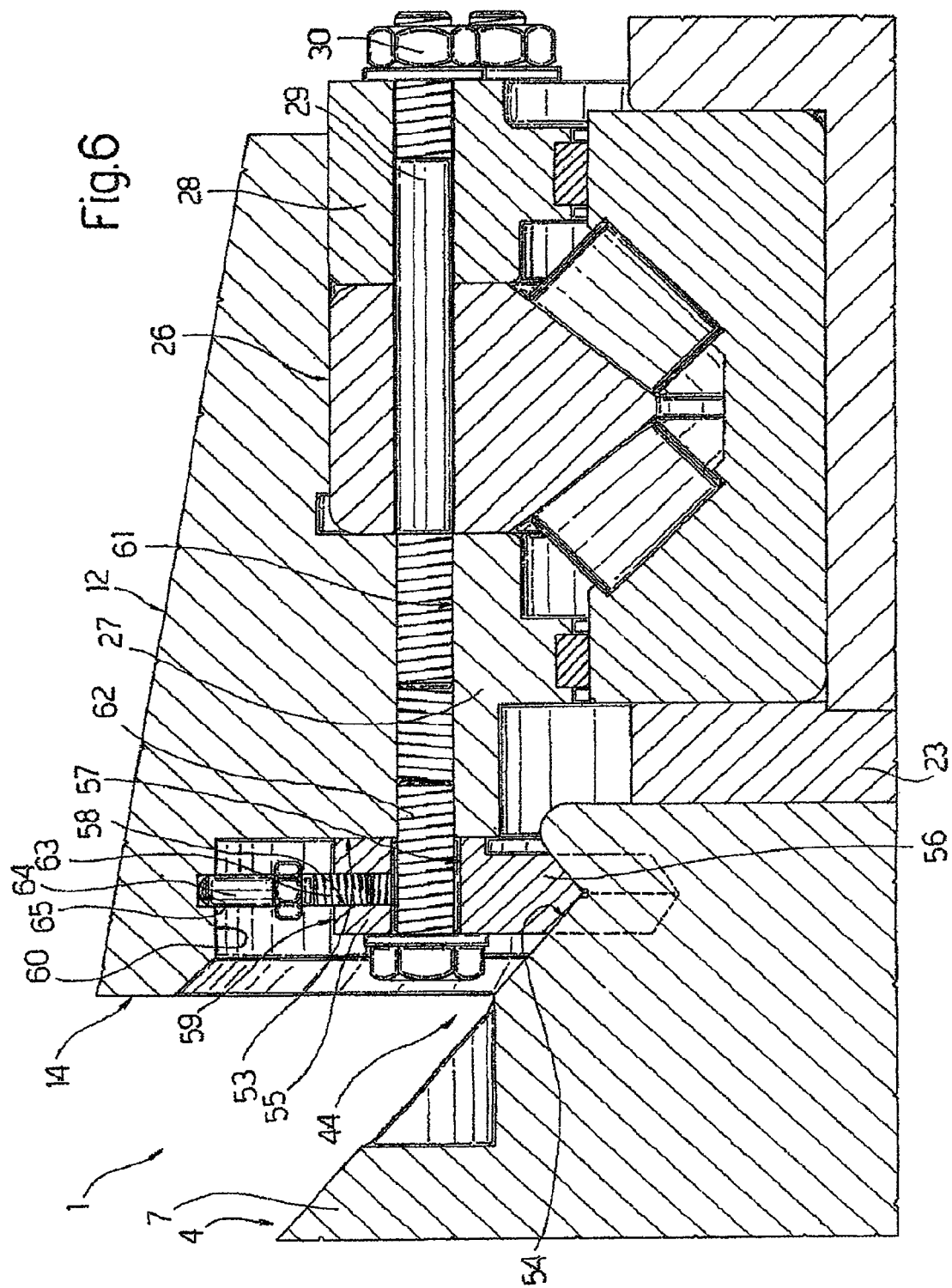

WIND POWER TURBINE

PRIORITY CLAIM

This application claims the benefit of and priority to Italian Patent Application No. MI2008A 001340, filed on Jul. 23, 2008, the entire contents of which are incorporated herein.

TECHNICAL FIELD

The present invention relates to a wind power turbine. More specifically, the present invention relates to a wind power turbine of the type comprising a nacelle normally mounted on top of a pylon; an electric generator housed in the nacelle and comprising a rotor and a stator; and a blade assembly fitted in rotary manner to the nacelle and comprising a hub, and a shaft fitted directly to the hub and rotor and supported by the stator with the interposition of bearing means.

BACKGROUND

In so-called direct-coupled wind power turbines of the above type (i.e., with no reducer between the blade assembly and the rotor), one of the components requiring most frequent maintenance and/or replacement is the bearing means, which normally comprise one or more relatively large-diameter bearings interposed between the blade assembly shaft and the stator of the electric generator.

To simplify maintenance and/or replacement, wind power turbines of the above type have been devised, in which the bearings can be worked on, after disconnecting the shaft from the blade assembly hub, from inside the nacelle, without having to detach and lower the blade assembly to the ground.

In known wind power turbines of this type, the shaft and bearings can obviously only be disconnected after angularly locking the blade assembly with respect to the stator.

In known wind power turbines of the above type, angularly locking the blade assembly normally involves first positioning the blade assembly angularly with respect to the stator, in that locking can normally only be achieved by selectively setting the blade assembly to a given number of angular positions with respect to the nacelle.

Given the size and the sensitivity to external agents of the blade assemblies employed, setting the blade assembly to given angular positions with respect to the nacelle is rarely fast or easy.

SUMMARY

It is an object of the present invention to provide a wind power turbine of the above type, designed to substantially eliminate the aforementioned drawbacks.

More specifically, it is an object of the present invention to provide a wind power turbine of the above type, in which the blade assembly can be locked with respect to the stator of the electric generator regardless of the angular position of the blade assembly with respect to the stator.

According to the present invention, there is provided a wind power turbine as claimed in the attached claims.

Additional features and advantages are described in, and will be apparent from, the following Detailed Description and the figures.

BRIEF DESCRIPTION OF THE DRAWINGS

A number of non-limiting embodiments of the present invention will be described by way of example with reference to the accompanying drawings, in which:

FIG. 3 shows a larger-scale, partly exploded half axial section of a detail in FIG. 2;

FIG. 4 shows an exploded view of the FIG. 3 detail;

FIG. 6 shows a larger-scale half axial section of a detail of a second embodiment of the wind power turbine according to the present invention;

DETAILED DESCRIPTION

Figure 5:
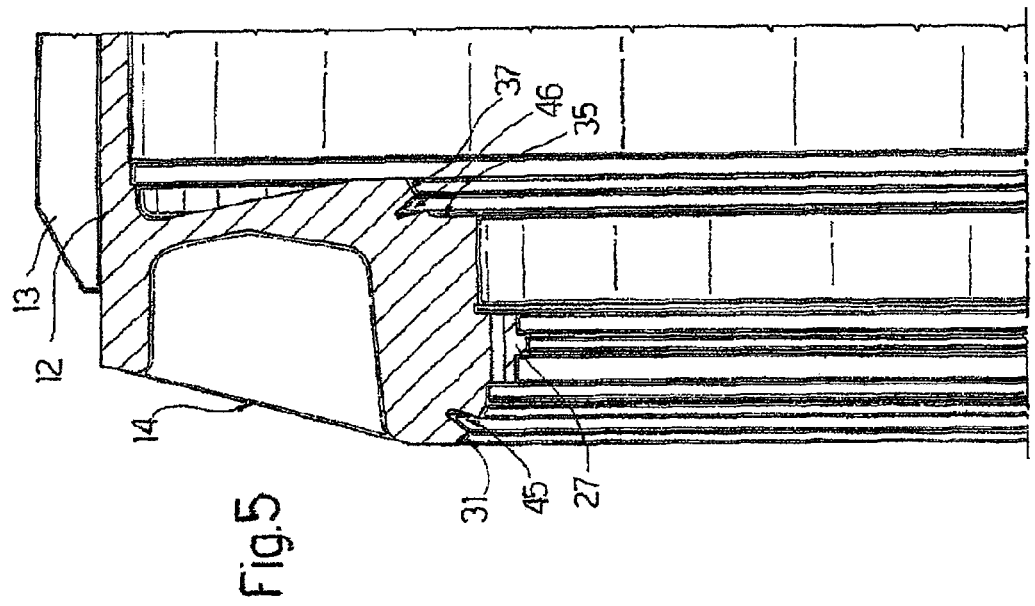
FIG. 5 shows a schematic view in perspective of a detail in FIGS. 3 and 4.
Figure 1:
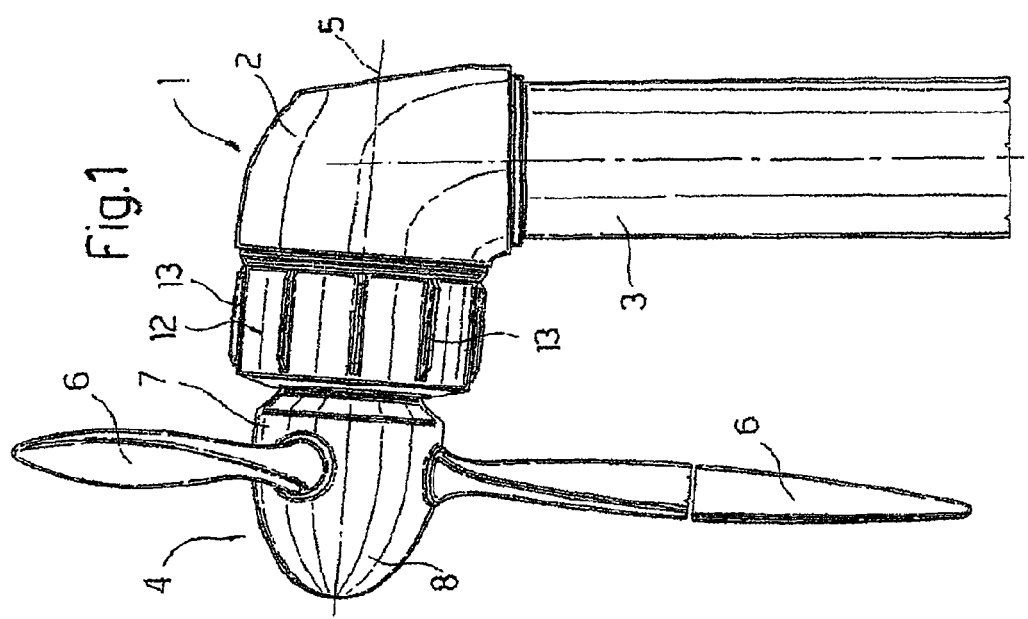
FIG. 1 shows a side view, with parts removed for clarity, of a first embodiment of the wind power turbine according to the present invention.

Number 1 in FIG. 1 indicates as a whole a wind power turbine comprising a nacelle 2 mounted on top of a pylon 3 and supporting for rotation a blade assembly 4 positioned with its axis 5 substantially horizontal.

Figure 2:
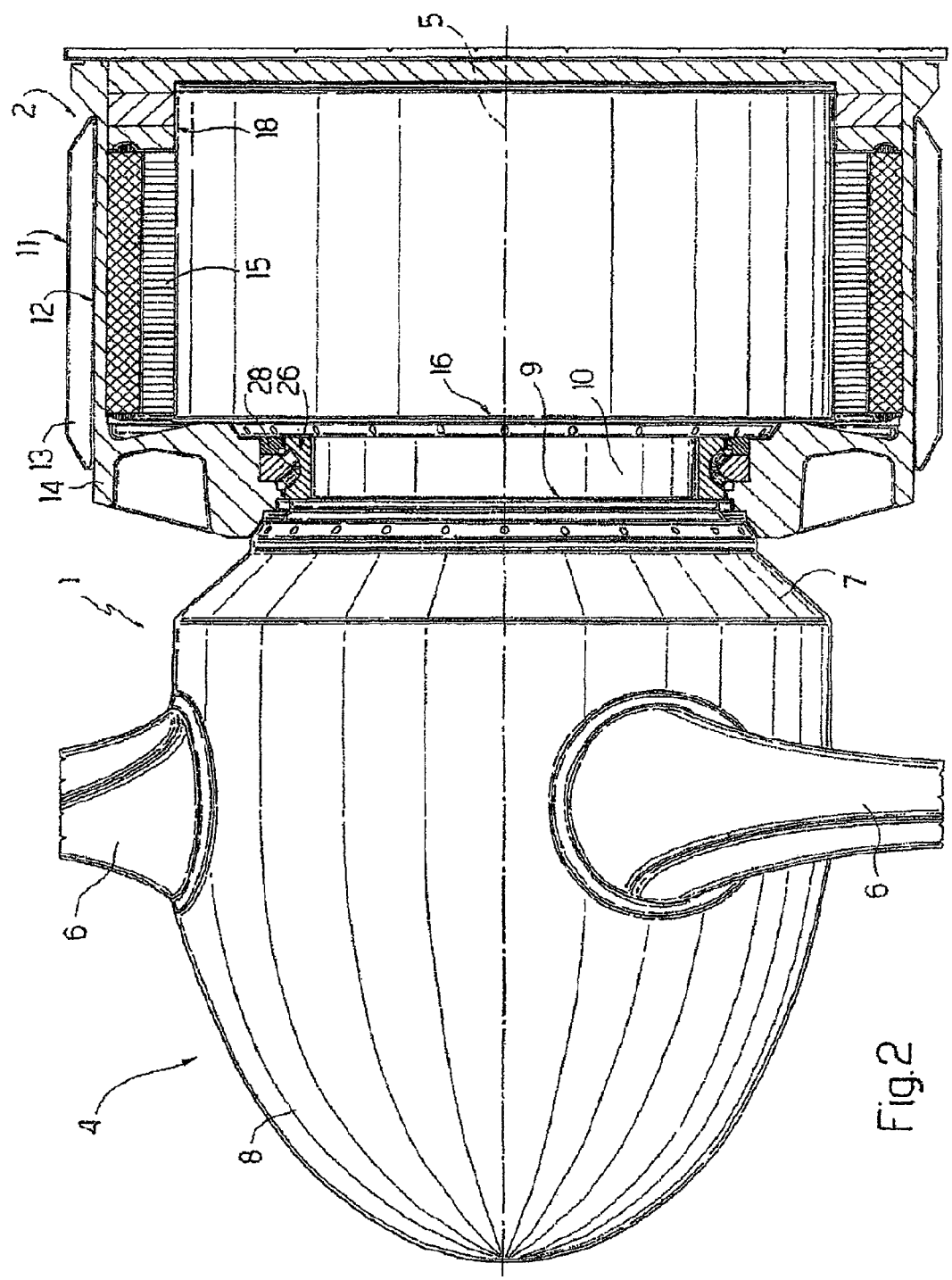
FIG. 2 shows a larger-scale, partial axial section of a detail in FIG. 1.

As shown in FIG. 2, blade assembly 4 comprises a number of blades 6 substantially radial with respect to axis 5 and supported by a hub 7, which is shaped at the front to form an ogive 8, and is tapered at the rear and connected by a face coupling or connector 9 to the outer end of a tubular shaft 10 coaxial with axis 5.

The end of nacelle 2 facing blade assembly 4 and engaged by shaft 10 is defined by an electric generator 11 comprising a tubular outer stator 12, which is coaxial with axis 5, has outer axial cooling fins 13, and terminates, on the side facing blade assembly 4, with an inner annular flange 14 having a substantially trapezoidal cross section tapering outwards and with its major base facing axis 5. Electric generator 11 also comprises a tubular rotor 15, which is coaxial with axis 5 and stator 12, is located inside stator 12, is connected angularly to an inner end of shaft 10 by a connecting device or connector 16, and comprises an inner cylindrical wall 17 defining, inside nacelle 2, a chamber 18 accessible from the outside, in a manner not shown, to permit maintenance and/or replacement work inside chamber 18, as described in detail below.

As shown more clearly in FIGS. 3 and 4, shaft 10 has an inner annular flange 19 on the end facing hub 7, and an outer annular flange 20 at the opposite end; and hub 7 has, on the side facing shaft 10, an inner annular flange 21 facing flange 19 of shaft 10, and a truncated-cone-shaped outer surface 22 that forms a roughly 45° angle with axis 5, tapers towards shaft 10, and is located outwards of flange 21.

Flanges 19 and 21 form part of face coupling 9, which also comprises an annular plate 23 interposed between flanges 19 and 21; and a set of screws 24, each of which is fitted inside a respective axial through hole in shaft 10, and a respective through hole in annular plate 23, and engages a respective threaded hole 25 in flange 21.

Annular plate 23 has an annular outer portion, which projects outwards of a cylindrical outer surface of shaft 10, is shimmed on the side facing flange 20 to form a locator for annular plate 23 on shaft 10, and defines, together with the outer surface of shaft 10 and flange 20, a cylindrical chamber for housing and locking to shaft 10 the inner ring of a conical roller bearing 26 interposed between shaft 10 and stator 12, and comprising an outer ring locked to the inner periphery of flange 14 of stator 12 as described below.

As shown in FIGS. 3 and 4, flange 14 is bounded, on the side facing shaft 10, by a cylindrical surface, from which projects inwards an annular rib 27 defining an annular outer lateral supporting shoulder for the outer ring of bearing 26. On the side facing inner chamber 18, the outer ring of bearing 26 is shouldered by an annular body 28, which is locked axially to flange 14 by a set of studs 29, each of which engages a respective threaded axial hole in rib 27, a respective axial through hole in annular body 28, a respective axial through hole in the outer ring of bearing 26, and a respective nut 30 for locking annular body 28 to the outer ring of bearing 26.

To the front of rib 27, flange 14 has a conical surface 31 tapering towards inner chamber 18 and facing truncated-cone-shaped surface 22 of hub 7. Each generating line of truncated-cone-shaped surface 31 is parallel to a corresponding generating line of truncated-cone-shaped surface 22, and forms a roughly 45° angle with axis 5.

An annular flange projects inwards from the end of wall 17 of rotor 15, has a substantially T-shaped cross section, faces an axially inner annular surface of flange 14, and comprises, on its inner periphery, a ring 32 facing the outer periphery of flange 20 of shaft 10. Ring 32 is bounded, on the side facing flange 20, by a truncated-cone-shaped surface 33 defining, with a substantially cylindrical lateral surface of flange 20, an annular groove 34 with a substantially triangular cross section open on the side facing chamber 18. An annular portion of ring 32 engages an annular cavity 35 formed in flange 14. More specifically, ring 32 is bounded, on the side facing wall 17 of rotor 15, by a truncated-cone-shaped surface 36 tapering towards blades 6 and facing a like truncated-cone-shaped surface 37 of annular cavity 35. Each generating line of truncated-cone-shaped surface 36 is parallel to a corresponding generating line of truncated-cone-shaped surface 37, and forms a roughly 45° angle with axis 5.

Flange 20 of shaft 10 and ring 32 are coplanar, and are connected integrally by connecting device 16, which is a press-in connecting device and comprises an annular plate 38 positioned contacting an annular axial-end surface of flange 20. The outer periphery of annular plate 38 projects radially outwards of flange 20 and is fitted with an axial annular rib 39 having a substantially trapezoidal cross section, and which pressure engages annular groove 34 to lock flange 20 and ring 32 to each other. Annular rib 39 is retained inside annular groove 34 by a set of screws 40, each of which extends inside a respective axial through hole formed through annular plate 38 and annular rib 39, and engages a respective threaded hole 41 formed axially in ring 32.

An annular groove 42 is formed in a front annular surface of the annular whole defined by flange 20 and ring 32 connected integrally to each other by connecting device 16, is positioned facing annular body 28, and communicates with chamber 18 via a number of axial holes 43, each of which is formed through flange 20 and annular plate 38, is coaxial with a respective screw 29, and allows an operator inside chamber 18 to work on screw 29.

Wind power turbine 1 comprises a locking device 44 by which, when necessary, to lock its mobile assembly, comprising blade assembly 4, shaft 10 and rotor 15, to its fixed assembly comprising nacelle 2 and stator 12, regardless of the angular position of the mobile assembly with respect to the fixed assembly.

Locking device 44 includes angular lockers which, in one embodiment, include annular, trapezoidal-cross-section grooves 45, 46 and rings of screws 47 and 48. In this embodiment, the locking device 44 comprises two annular, trapezoidal-cross-section grooves 45, 46 coaxial with axis 5 and formed in truncated-cone-shaped surface 31 and truncated-cone-shaped surface 37 respectively. In this embodiment, locking device 44 also comprises two rings of screws 47 and 48, each of which is inclined with respect to axis 5, is perpendicular to respective truncated-cone-shaped surface 31, 37, and has a truncated-cone-shaped end portion 49. Each screw 47 engages a respective threaded through hole 50 formed through hub 7 and truncated-cone-shaped surface 22, and is substantially perpendicular to truncated-cone-shaped surface 22; and each screw 48 engages a respective threaded through hole 51 formed through ring 32 and truncated-cone-shaped surface 36 from annular groove 42, and is substantially perpendicular to truncated-cone-shaped surface 36.

Locking device 44 also comprises a set of inclined holes 52, each of which is formed in flange 20 of shaft 10, coaxially with respective screw 48, and allows an operator inside chamber 18 to work on screw 48. The length of each screw 47, 48 is such that, before screw 47, 48 is tightened down completely, the respective truncated-cone-shaped end portion 49 projects outwards of respective threaded hole 50, 51 and pressure engages relative annular groove 45, 46.

In actual use, to carry out maintenance work on and/or change bearing 26, an operator inside chamber 18 first tightens screws 48, so that truncated-cone-shaped portions 49 of the screws pressure engage groove 46 to lock rotor 15 angularly to stator 12. Screws 47 are then tightened so that respective truncated-cone-shaped portions 49 pressure engage groove 45 to safely lock blade assembly 4 both angularly and axially to stator 12 and therefore to nacelle 2.

At this point, the operator removes screws 24 and 40 and nuts 30 to detach shaft 10 and bearing 26 as a whole from hub 7. If bearing 26 is cold-fitted to shaft 10, the operator first removes screws 40 and screws 24, to withdraw shaft 10 from bearing 26, and then removes nuts 30 to withdraw annular body 28 and, therefore, bearing 26 from flange 14 of stator 12. If bearing 26 is hot-fitted to shaft 10, the operator first removes screws 24 and nuts 30 to withdraw shaft 10 and bearing 26 as a whole from flange 14 of stator 12, and bearing 26 is removed later from shaft 10.

Screws 47 therefore provide not only for locking blade assembly 4 angularly to stator 12 in any relative angular position, but also for making blade assembly 4 and stator 12 integral with each other, so shaft 10 and bearing 26 can be removed from the inside, without having to dismantle blade assembly 4.

FIG. 6 shows a second embodiment of wind power turbine 1, the component parts of which are indicated, where possible, using the same reference numbers as for the corresponding parts of the FIG. 1-5 embodiment.

The FIG. 6 variation relates to a further embodiment of part of locking device 44 including an angular locker that includes a wedge 55 and a groove 54. More specifically, FIG. 6 relates to the part of locking device 44 for locking blade assembly 4 angularly to stator 12.

The blade assembly is locked angularly to the stator by forming, in flange 14 of stator 12, a number of groove sectors 53 coaxial with axis 5, equally spaced about axis 5, and facing hub 7. An annular groove 54 with a V-shaped cross section is formed in hub 7, facing sectors 53. Each sector 53 houses a wedge 55 comprising an end portion 56, which has a triangular cross section and pressure engages groove 54 to safely connect blade assembly 4 to stator 12 and, therefore, to nacelle 2 both angularly and axially.

Accordingly, each wedge 55 has a substantially central through hole 57 parallel to axis 5; and a threaded hole 58 extending radially with respect to axis 5 from an end surface 59 of relative wedge 55 facing an outer end surface 60 of relative sector 53.

During assembly, each wedge 55 is fitted inside relative sector 53, so relative through hole 57 is coaxial with a relative threaded through hole 61 formed in annular rib 27 and engaged partly, on the side facing bearing 26, by a portion of relative stud 29 for locking the inner ring of bearing 26 to stator 12. Each wedge 55 is secured to stator 12 by a respective screw 62, which loosely engages relative through hole 57 and engages the free portion of relative threaded hole 61.

Each hole 58 is engaged by a respective screw 63, from the head of which extends an axial pin 64 which pressure engages a relative cavity 65 formed in relative surface 60. The length of screw 63, complete with respective pin 64, is such that, when screw 63 is screwed substantially completely inside relative threaded hole 58 and the end portion 56 of relative wedge 55 engages groove 54, the free end of pin 64 is located outside relative cavity 65 and at a given distance from relative surface 60.

In this second embodiment, if bearing 26 calls for maintenance and/or replacement, the operator can only lock blade assembly 4 to stator 12 from outside turbine 1. The operator first fits wedges 55, complete with respective screws 63 screwed down completely, inside relative sectors 53, and connects wedges 55 to the stator by means of screws 62, which are assembled but not tightened. Next, the operator gradually unscrews screws 63 so that relative pins 64 pressure engage relative cavities 65, and end portions 56 of relative wedges 55 pressure engage groove 54. At which point, the operator tightens screws 62 to lock wedges 55 in position on stator 12.

Next, the operator may proceed, from inside nacelle 2, to lock rotor 15 to stator 12 and to remove shaft 10 and bearing 26.

Figure 7:
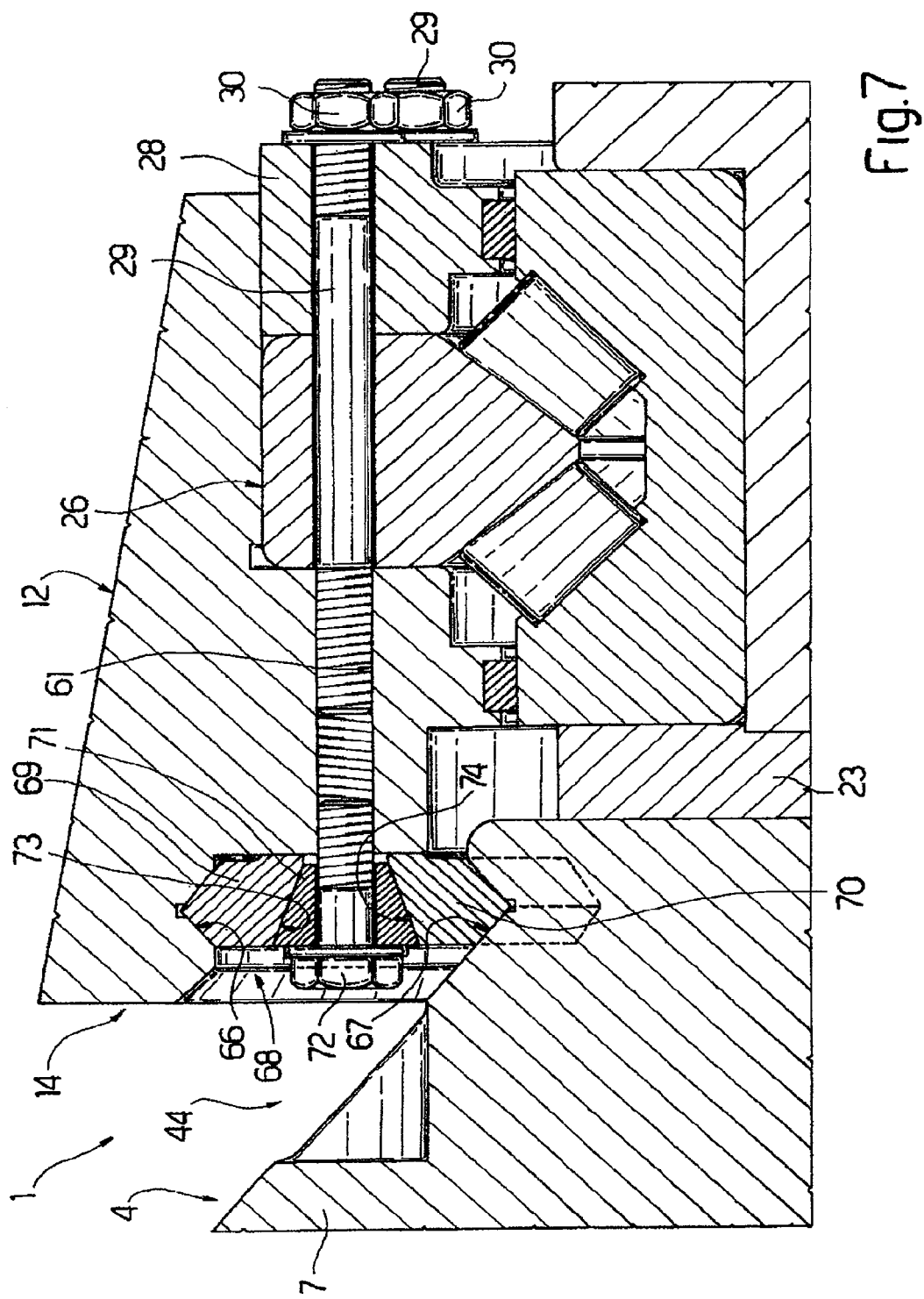
FIG. 7 shows a larger-scale half axial section of a detail of a third embodiment of the wind power turbine according to the present invention.

The FIG. 7 variation relates to a further embodiment of locking device 44, which comprises a groove 66, which is coaxial with axis 5, faces hub 7, is formed in flange 14 of stator 12, and has a V-shaped cross section; an annular groove 67, which is formed in hub 7, has a V-shaped cross section, and faces groove 66; and at least one expandable sector 68 which pressure engages grooves 66 and 67. More specifically, expandable sector 68 comprises an outer wedge-shaped member 69; an inner wedge-shaped member 70; an intermediate wedge-shaped member 71; and screws 72 which engage threaded hole 61.

Outer and inner wedge-shaped members 69 and 70 pressure engage respective grooves 66 and 68, and have respective conical faces 73 and 74 facing each other.

Tightening screws 72 causes intermediate wedge-shaped member 71 to move, with respect to outer and inner wedge-shaped members 69 and 70, along conical faces 73 and 74, and outer and inner wedge-shaped members 69, 70 to gradually expand radially. Conversely, loosening screws 72 reduces to zero the pressure exerted by expandable sector 68.

Figure 8:
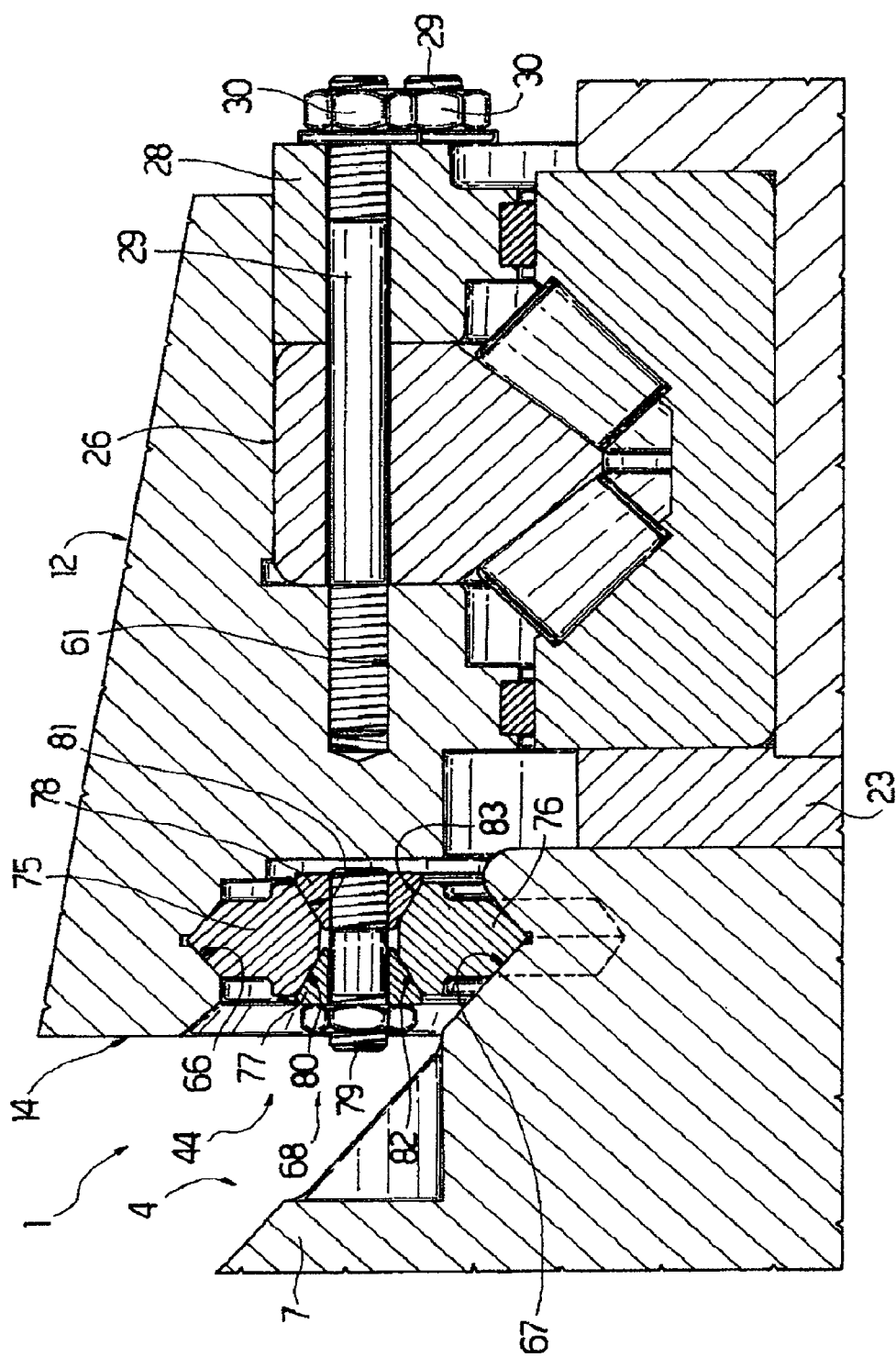
FIG. 8 shows a half axial section of a variation of FIG. 7.

The FIG. 8 variation relates to a further embodiment of locking device 44, and in particular of expandable sector 68 for pressure engaging grooves 66 and 67. In the FIG. 8 example, expandable sector 68 comprises an outer wedge-shaped member 75; an inner wedge-shaped member 76; two opposite, facing intermediate wedge-shaped members 77 and 78; and screws 79 which engage the two intermediate wedge-shaped members 77 and 78.

The outer and inner wedge-shaped members 75 and 76 pressure engage respective grooves 66 and 68. Wedge-shaped member 75 has two converging faces 80 and 81, and, similarly, wedge-shaped member 76 has two converging conical faces 82 and 83.

Tightening screws 79 causes intermediate wedge-shaped members 77 and 78 to move, with respect to outer and inner wedge-shaped members 75 and 76, along conical faces 73 and 74, and outer and inner wedge-shaped members 75, 76 to gradually expand radially. Conversely, loosening screws 79 reduces to zero the pressure exerted by expandable sector 68.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A wind power turbine comprising:
an electric generator having a stator and a rotor;
a fixed assembly including the stator;
a mobile assembly including the rotor and mounted on the fixed assembly, said mobile assembly configured to rotate with respect to the fixed assembly about an axis; and
a locking device configured to lock the mobile assembly to the fixed assembly, the locking assembly including:
at least a groove formed in one of the fixed assembly and the mobile assembly and is coaxial to the axis, and
an angular locker configured to pressure engage the groove.

2. The wind power turbine of claim 1, wherein the groove is an annular groove and the angular locker include a plurality of wedge-shaped members carried by the other one of the fixed assembly and the mobile assembly, each of said wedge-shaped members is configured to actuate to pressure engage the annular groove.

3. The wind power turbine of claim 2, wherein the wedge-shaped members include at least a set of locking screws, each locking screw configured to engage a relative threaded hole formed in the other one of the fixed assembly and the mobile assembly to pressure engage the annular groove.

4. The power turbine of claim 3, wherein the annular groove has a trapezoidal cross-section, and each locking screw has a conical tip configured to pressure engage the annular groove.

5. The wind power turbine of claim 3, wherein each locking screw is inclined with respect to the axis and the annular groove is formed along a conical surface perpendicular to the locking screws.

6. The wind power turbine of claim 3, wherein the threaded hole is formed in the mobile assembly.

7. The wind power turbine of claim 2, wherein the wedge-shaped members include a set of wedges that are each configured to engage a relative seat formed in the other of the fixed assembly and the mobile assembly, each wedge is configured to move radially to pressure engage the annular groove.

8. The wind power turbine of claim 2, wherein the angular locker includes a first stator locker configured to angularly lock the blade assembly with respect to the stator, and a second rotor locker configured to angularly lock the rotor with respect to the stator, each of said first stator locker and said second rotor locker includes a relative annular groove and a relative set of wedge-shaped members.

9. The wind power turbine of claim 8, wherein the first stator locker includes a first annular groove formed in the stator and a first set of locking screws mounted on the blade assembly and configured to pressure engage the first annular groove.

10. The wind power turbine of claim 9, wherein the second rotor locker includes a second annular groove formed in the stator, and a second set of locking screws mounted on the rotor and configured to pressure engage the second annular groove.

11. The wind power turbine of claim 9, wherein the annular grooves are formed along respective conical surfaces of the stator.

12. The wind power turbine of claim 11, wherein the blade assembly includes a hub, and each locking screw of the first set of locking screws is configured to fit into a relative threaded hole formed in the hub.

13. The wind power turbine of claim 11, wherein the rotor includes an inner flange, and each locking screw of the second set of locking screws is configured to fit into a relative threaded hole formed in said inner flange.

14. The wind power turbine of claim 8, wherein the first stator locker includes a first annular groove formed in the blade assembly and a set of wedge-shaped members which are each configured to radially sliding releasably engage a relative seat formed in the stator, said set of wedge-shaped members radially mobile and configured to pressure engage the first annular groove.

15. The wind power turbine of claim 14, which includes:
a first screw set between each wedge-shaped member and the relative seat and configured to displace the wedge-shaped member towards the first annular groove, and
a second screw configured to engage each wedge-shaped member to lock the wedge-shaped member in the relative seat and on the stator.

16. The wind power turbine of claim 1, wherein the fixed assembly includes a nacelle, and the stator, and the mobile assembly includes a blade assembly, the rotor, a shaft coaxial with the axis, a first connector configured to dismountably connect the shaft directly to the blade assembly, a second connector configured to dismountably connect the shaft to the rotor and a bearing set between the shaft and the stator, said bearing configured to rotatably support the shaft on the stator.

17. The wind power turbine of claim 16, wherein the second connector includes a plurality of wedge-shaped members set between the shaft and the rotor and a screw mounted on the wedge-shaped members, said screw configured to dismountably couple to the rotor to push the wedge-shaped members between the shaft and the rotor.

18. The wind power turbine of claim 17, wherein said wedge-shaped members include an annular rib coaxial with the axis and a wedge-shaped cross section.

19. The wind power turbine of claim 18, wherein the second connector includes an annular plate set in contact with a free end of the shaft, wherein a peripheral portion of the annular plate protrudes towards the outside of the shaft and supports the annular rib.

20. The wind power turbine of claim 1, wherein the locking device includes at least a first groove formed in the fixed assembly, a second groove formed in the mobile assembly and facing the first groove, and the angular locker is configured to pressure engage the first groove and the second groove.

21. The wind power turbine of claim 20, wherein the angular locker includes at least an expandable annular sector including an outer wedge-shaped member, an inner wedge-shaped member configured to respectively pressure engage the first groove and the second groove, and at least an intermediate wedge-shape member configured to selectively space apart the outer wedge-shaped member and the inner wedge-shaped member.

* * * * *